United States Patent Office 3,142,643
Patented July 28, 1964

3,142,643
GREASES THICKENED WITH SALTS OF COPOLYMERS OF UNSATURATED DICARBOXYLIC ACID ESTERS AND VINYL ACETATE
Arnold J. Morway, Clark, and Jeffrey H. Bartlett, New Providence, N.J., assignors to Esso Research and Engineering Company, a corporation of Delaware
No Drawing. Filed Mar. 20, 1959, Ser. No. 800,632
5 Claims. (Cl. 252—41)

This invention relates to lubricating greases containing a thickener which comprises the metal salt of a copolymer of a neutral ester of an unsaturated carboxylic acid with vinyl acetate. Particularly, the invention relates to lubricating grease compositions containing an alkali metal salt of a copolymer prepared from a diester of a $C_4$ unsaturated dicarboxylic acid copolymerized with vinyl acetate.

This application is a continuation-in-part of our application, Serial No. 448,364, filed August 6, 1954, now Patent No. 2,929,785.

The unsaturated ester mentioned above is a diester of fumaric or maleic acid fully esterified with a $C_8$ to $C_{18}$ alcohol. This unsaturated ester is then copolymerized with vinyl acetate to form the copolymer. The copolymer is next converted into a salt thickener by reaction with an alkali metal base. Thus the copolymer salt of this invention includes all products of saponification, partial or complete, of the copolymer with an alkali metal base.

The unsaturated ester is prepared by conventional esterification techniques by mixing the reactants, with or without an esterification catalyst such as sulfuric acid, heating to reflux and removing the water evolved overhead. The alcohols which can be used may be straight or branched chain such as octanol, isooctanol, decanol, lauryl alcohol, tetradecanol, etc. A particularly suitable commercially available alcohol is that made by hydrogenation of coconut oil and sold under the trade name "Lorol." This material is a mixture of saturated straight chain alcohols having from about 10 to 18 carbon atoms per molecule with lauryl alcohol forming a major proportion of the mixture. A similar commercial product which is sold under the trade name "Lorol B" may likewise be used. The approximate compositions of these materials are tabulated below:

COMPOSITION OF MIXTURES OF
COMMERCIAL ALCOHOLS

| Component | (Trade Name) | |
|---|---|---|
| | Lorol | Lorol B |
| | Weight percent | |
| $C_{10}$ Alcohol | 4.0 | 3.0 |
| $C_{12}$ Alcohol | 55.5 | 46.0 |
| $C_{14}$ Alcohol | 22.5 | 24.0 |
| $C_{16}$ Alcohol | 14.0 | 10.0 |
| $C_{18}$ Alcohol | 4.0 | 17.0 |
| Average Number of Carbon Atoms | 12.8 | 13.5 |

After the ester is prepared, the copolymerization is carried out by heating the monomers, i.e. the ester and vinyl acetate, at a temperature of 60° to 140° C. for about 1 to 24 hours in the presence of a polymerization catalyst such as benzoyl peroxide, cumene hydroperoxide, 2,2-bis-(t-butyl peroxy) butane, t-butyl hydroperoxide, lauroyl peroxide, potassium persulfate, etc. Usually 0.2 to 5%, preferably 0.5 to 2.0%, of catalyst by weight based on total monomers will be employed. Generally about one mole of the unsaturated ester will be reacted with about 0.2 to 20.0 moles, preferably one mole, of the vinyl acetate. The copolymer may also contain a minor amount (such as 0.1 to 1.0 mole) of a third ethylenically unsaturated monomer such as maleic anhydride or 2-N-vinyl pyrrolidone.

The grease compositions of this invention will contain a major amount of lubricating oil and about 2 to 35% by weight, based on the total composition, of the metal salt of the copolymer. The grease can be prepared by dispersing the copolymer in lubricating oil and then by adding alkali metal hydroxides, carbonates, etc. to neutralize or saponify the copolymer. The amount of the metal base which is used should be sufficient to form at least one COOM (where M=a metal) group in each saponified copolymeric molecule. Greater amounts of the metal reacting compound may be employed, if desired, up to an amount which would react with substantially all of the carboxylic groups present in the original copolymeric molecule. The mixture is then heated to about 250° to 600° F., preferably 400° to 600° F. until dehydration is essentially complete and the desired conversion has been obtained, which is usually the case after about 0.5 to 5 hours. The reaction mixture is thereafter quenched or allowed to cool and then may be diluted with further amounts of lubricating oil to obtain the desired grease consistency.

The salt of the copolymer may be used as the sole thickening agent, or it may be used in conjunction with other thickeners such as soaps of $C_{12}$ to $C_{30}$, preferably $C_{12}$ to $C_{22}$, fatty acids, or as a component of a mixed-salt type thickener. In this latter case, the thickener can be prepared from various combinations of the copolymer salt with salts of $C_2$ to $C_4$ fatty acids and with or without soaps of $C_{12}$ to $C_{30}$ fatty acids being present. By heating the mixed-salts or the soap-salt mixture to temperatures of 400° to 600° F., preferably from 430° to 550° F., a complex may be formed which will result in increased thickening effect. For example, high molecular weight acids such as hydrogenated fish oil acids, $C_{12}$ to $C_{22}$ naturally occurring acids of animal or vegetable origin, stearic acid, hydroxystearic acids such as 12-hydroxy stearic, dihydroxy stearic, poly-hydroxy stearic, and arachidic acid, tallow acids, etc., may be mixed with the lubricating oil and the copolymers of this invention prior to the neutralization, dehydration and cooking steps described above. The soaps of these conventional high molecular weight acids may be used in amounts ranging from about 2 to 30 wt. percent, preferably about 5 to 15 wt. percent, based on the finished product. Also, salts of low molecular weight acids such as those fatty carboxylic acids having 2 to 4 carbon atoms per molecule, e.g. acetic acid, may be likewise used in proportions of about 1 to 10 wt. percent, preferably about 2 to 6 wt. percent, based on the finished product. If used with other salts or soap, the copolymer salt thickener of this invention preferably comprises about 30 to 50 wt. percent of the total grease thickener or about 2 to 25 wt. percent of the finished grease.

Other conventional thickeners, anti-oxidants, corrosion inhibitors, tackiness agents, load-carrying compounds, viscosity index improvers, oiliness agents, and the like may be added prior, during or after the grease-making process described above as will be apparent to those skilled in the art.

Although it is generally preferred in the grease-making procedure of this invention to form the metal salts of the carboxylic copolymers in-situ, it will be understood that, if desired, they may be initially prepared in a separate step and then subsequently added to the mixture of the grease ingredients. These salts of the carboxylic copolymers may be simply prepared by adding the desired amount of the basic reacting compound of the metal to the copolymer and mixing the two ingredients together, at an elevated temperature, generally in the range of about 100° to 500° F. The time required for completion of the reaction will depend upon the temperature employed as well as the nature and the molecular weight of the copolymer. More specifically the saponification of the low molecular weight copolymers will require only a few minutes whereas the saponification of the higher molecular weight copolymers may require a period of time in the range of about 0.5 to 10 hours. The amount of the metal compound employed will be the same as set forth previously in this specification in the procedure for preparing the salts in-situ. When the salts of the carboxylic copolymers are formed in a separate step, the reaction is preferably carried out in an aqueous or alcohol medium, which medium is subsequently removed by simple distillation after the reaction is completed. During the grease making procedure described above, it is believed that a variety of reactions occur with the polymeric units when the alkali hydroxide is employed as the saponification agent. Examples of such reactions using a copolymer of vinyl acetate and a fumaric acid diester of Lorol B alcohol may be represented by the following equations:

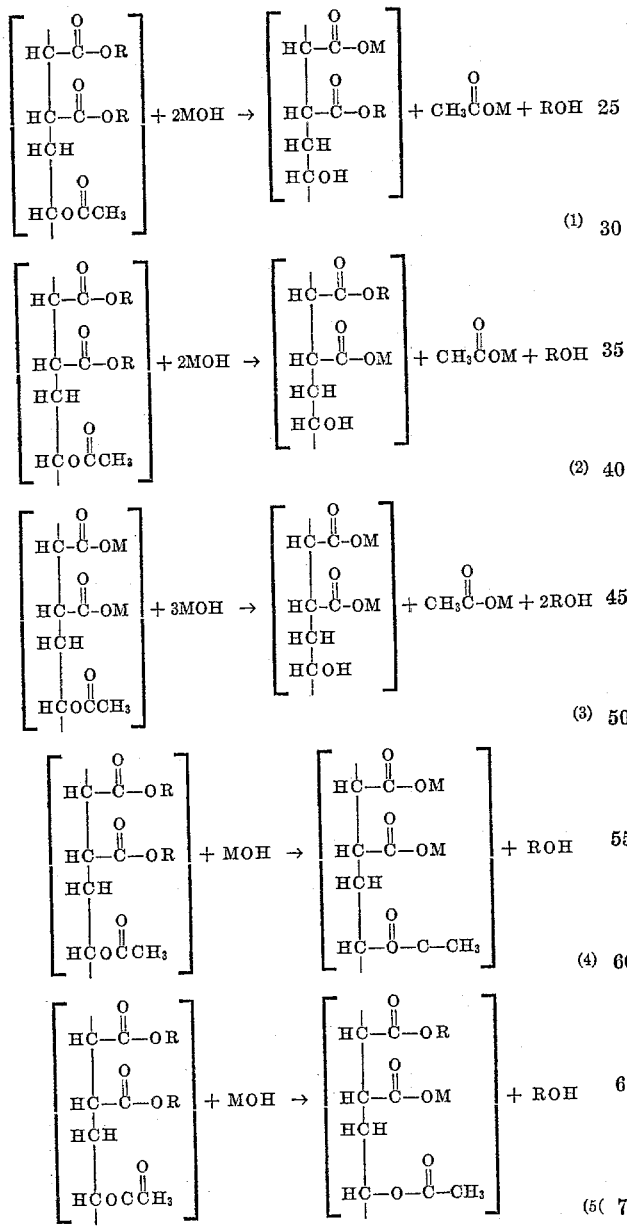

where R is the residue of Lorol B alcohol and M is an alkali metal.

The invention will be best understood by reference to the following specific examples which are preferred embodiments of this invention.

*Example 1.—Preparation of Lorol B Fumarate-Vinyl Acetate Copolymer*

A Lorol B fumarate neutral ester (i.e. a diester) was prepared containing 5% of free unreacted alcohol. $H_2SO_4$ was used as the esterification catalyst. The fumarate ester was copolymerized with vinyl acetate using 80 parts of fumarate to 20 parts vinyl acetate in the presence of 0.6 part of benzoyl peroxide. The copolymerization was carried out at 160° F. for 11½ hours. This copolymer had a molecular weight in the range of 4500–5500. This copolymer was employed in the preparation of the grease described below:

FORMULATION

| Ingredients: | Pct. Wt. |
|---|---|
| Lorol B fumarate-vinyl acetate copolymer | 14.00 |
| Hydrofol acids 54 [1] | 10.00 |
| Sodium hydroxide | 6.50 |
| Phenyl α-naphthylamine | 1.00 |
| Mineral lubricating oil (55 SUS at 210° F. and 63 V.I.) | 68.50 |

[1] Mixture of hydrogenated fish oil acids similar to stearic acid in average chain length, degree of unsaturation and saponification number.

PREPARATION

The copolymer, the Hydrofol acids and one-third of the lubricating oil were charged to a fire heated grease kettle equipped with means of agitation. The temperature was raised to about 150° F. and a 40% aqueous solution of the sodium hydroxide was added. The temperature was slowly raised to about 340° F. and the balance of the lubricating oil was added, after which the temperature was raised to about 500° F. At this temperature a sample was removed and cooled rapidly with no agitation. The temperature of the remainder of the composition was then slowly lowered with agitation in the kettle to about 275° F. Thereafter, the phenyl α-naphthylamine was added and the grease further cooled to about 200° F. Both the kettle cooled product and the sample were of excellent structure and had the following properties:

PROPERTIES

Percent free alkalinity as NaOH ---- 1.76.
Dropping point, ° F. ---- 500+.
Appearance ---- Excellent, smooth grease.
Water washing test, percent loss ---- 5.0.
Norma Hoffmann oxidation, hours to 5 p.s.i. drop in pressure ---- 245.
Penetrations 77° F. mm./10:

| | Kettle Cooled Product | Sample |
|---|---|---|
| Unworked | 177 | 175 |
| Worked 60 Strokes | 170 | 178 |

After Gaulin homogenization:
Unworked ---- 200 } Grease
Worked 60 strokes ---- 211 } warm (85° F.).
Worked 100,000 strokes ---- 290.

*Example 2*

FORMULATION

| Ingredients: | Percent weight |
|---|---|
| Grease of Example 1 | 50.0 |
| Mineral lubricating oil (55 SUS at 210° F. and V.I. of 100) | 50.0 |
| or | |
| Lorol B fumarate-vinyl acetate copolymer | 7.00 |
| Hydrofol acids 54 | 5.00 |
| Sodium hydroxide | 3.25 |
| Phenyl α-naphthylamine | 0.50 |
| Lubricating oil (63 V.I.) | 34.25 |
| Lubricating oil (100 V.I.) | 50.00 |

PREPARATION

To the kettle cooled grease of Example 1 was added an equal portion by weight of a mineral lubricating oil having a viscosity of 55 SUS and a V.I. of 100. This high V.I. (viscosity index) oil was too non-polar to obtain satisfactory dispersions of the soap with heating and therefore must be compounded into the structure by mechanical energy. Thus the grease-oil mixture was mixed together and the soft semi-homogeneous product was homogenized in a Gaulin homogenizer to ultimate hardness.

PROPERTIES

Appearance — Excellent smooth yellow homogenous product.

Penetration 77° F. mm./10:

| | |
|---|---|
| Unworked | 310 |
| Worked 60 strokes | 325 |
| Worked 100,000 strokes | 370 |
| Dropping point, ° F. | 420 |
| Water washing test, percent loss | 45 |
| Norma Hoffmann oxidation, hrs. to 5 p.s.i. drop in oxygen pressure | 240 |

While the preceding examples have illustrated the use of the salt of the copolymer in combination with a soap of a fatty acid, the copolymer salt per se may be used to thicken oil. For example, a lubricating oil composition can be prepared by repeating the procedure of Example 1, wherein the Lorol B fumarate-vinyl acetate copolymer is added to about 20 parts by weight of mineral lubricating oil of Example 1 and then warmed to a temperature of 150° F. where sufficient sodium hydroxide in the form of a 40% aqueous solution is added in order to completely saponify the copolymer. The resulting mixture is then heated to a temperature of about 340° F. and about 40 parts of additional mineral oil is added. The material is then maintained at this temperature until it is dehydrated, whereupon the material may be cooled to room temperature to form a grease.

In sum, the present invention relates to grease compositions thickened with alkali metal salt of a copolymer of vinyl acetate and a fully esterified or neutral $C_4, \alpha\text{-}\beta$ ethylenically unsaturated dicarboxylic acid. Copolymers of this type and their preparation are well known in the art and have been described in numerous patents, e.g. see U.S. Patents Nos. 2,666,746; 2,694,685 and 2,803,598. Those oil-soluble copolymers of this type which have molecular weights of 2,000 to 20,000 may be used to make the salt of the invention.

The amount of alkali metal base used to make the salt should be sufficient to form at least one COOM group (where M is a metal) in each saponified copolymer molecule as well as neutralizing any conventional fatty acids which may be present. Greater amounts of the metal base can be used, up to an amount which would react with all the carboxylic groups present in the original copolymeric molecule. Amounts of 2 to 35 wt. percent, preferably 5 to 25 wt. percent of the salt can be advantageously used in oil.

What is claimed is:

1. A method of forming a complex soap-salt thickened grease which comprises reacting alkali metal base with a mineral oil dispersion of a $C_{12}$ to $C_{30}$ fatty acid and a copolymer of a neutral ester of a $C_4$ alpha-beta unsaturated dicarboxylic acid and a $C_8$ to $C_{18}$ alcohol copolymerized with vinyl acetate and heating to a temperature of about 400° to 600° F. for a time sufficient to form said complex.

2. A method of preparing a lubricating grease comprising a major amount of mineral lubricating oil and a thickening amount of metal salt which comprises saponifying an oil-soluble copolymer with alkali metal hydroxide in said oil to form at least one metal carboxylate group per copolymer molecule, wherein said copolymer has a molecular weight of about 2,000 to 20,000 and consists essentially of about 0.2 to 20 molar proportions of vinyl acetate per molar proportion of neutral ester of a $C_4$ alpha-beta unsaturated dicarboxylic acid and a $C_8$ to $C_{18}$ alcohol.

3. A method according to claim 2, wherein said alkali metal base is a sodium base and wherein said dicarboxylic acid is fumaric acid.

4. A method of preparing a lubricating grease composition wherein mineral lubricating oil is thickened to a grease consistency with a soap and a salt which comprises saponifying with alkali metal base in said lubricating oil, (1) a $C_{12}$ to $C_{30}$ fatty acid to form said soap and (2) a copolymer of a neutral ester of a $C_4$ alpha-beta unsaturated dicarboxylic acid and a $C_8$ to $C_{18}$ alcohol copolymerized with vinyl acetate in a molar ratio of about 0.2 to 20 moles of vinyl acetate per mole of said neutral ester to form said salt, wherein the amount of said salt of said copolymer is about 2 to 25 wt. percent, wherein the amount of said soap of said fatty acid is about 2 to 30 wt. percent, said weight percents being based on the weight of the total composition and wherein there is formed at least one metal carboxylate group per copolymer molecule.

5. A method of preparing a lubricating grease composition which comprises saponifying an oil-soluble copolymer and a $C_{12}$ to $C_{22}$ fatty acid with sodium hydroxide in mineral lubricating oil, heating the reaction mixture to about 250° to 600° F., until dehydration is essentially complete and cooling to obtain said grease composition to thereby form about 2 to 25 wt. percent of sodium salt of said copolymer and 5 to 15 wt. percent of sodium soap of said fatty acid, wherein said oil-soluble copolymer is a copolymer of about equal molar amounts of vinyl acetate and a neutral ester of a straight chain $C_8$ to $C_{18}$ alcohol and fumaric acid, and wherein there is formed at least one metal carboxylate group per copolymer molecule.

References Cited in the file of this patent

UNITED STATES PATENTS

| | | |
|---|---|---|
| 2,698,297 | Giammaria | Dec. 28, 1954 |
| 2,698,298 | Giammaria | Dec. 28, 1954 |
| 2,698,299 | Giammaria | Dec. 28, 1954 |
| 2,721,877 | Popkin et al. | Oct. 25, 1955 |
| 2,737,494 | Frank | Mar. 6, 1956 |
| 2,801,220 | Smith | July 30, 1957 |
| 2,846,392 | Morway et al. | Aug. 5, 1958 |
| 2,937,993 | Pattenden et al. | May 24, 1960 |